United States Patent
Wolfinger et al.

(10) Patent No.: US 12,342,270 B2
(45) Date of Patent: Jun. 24, 2025

(54) ENTERPRISE DEVICE IDENTITY PROXY FOR EXTENDING ENTERPRISE DEVICE PROFILE

(71) Applicant: Cisco Technology, Inc., San Jose, CA (US)

(72) Inventors: Charles Carlton Wolfinger, Littleton, CO (US); Timothy P. Stammers, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 427 days.

(21) Appl. No.: 17/830,757

(22) Filed: Jun. 2, 2022

(65) Prior Publication Data

US 2023/0397096 A1    Dec. 7, 2023

(51) Int. Cl.
| | |
|---|---|
| *H04W 48/18* | (2009.01) |
| *H04W 12/06* | (2021.01) |
| *H04W 76/15* | (2018.01) |
| *H04W 84/04* | (2009.01) |
| *H04W 88/18* | (2009.01) |

(52) U.S. Cl.
CPC ........... *H04W 48/18* (2013.01); *H04W 12/06* (2013.01); *H04W 76/15* (2018.02); *H04W 84/04* (2013.01); *H04W 88/182* (2013.01)

(58) Field of Classification Search
None
See application file for complete search history.

(56) References Cited

U.S. PATENT DOCUMENTS

| | | | |
|---|---|---|---|
| 2019/0238425 A1 | 8/2019 | Mladin et al. | |
| 2020/0245163 A1 | 7/2020 | Jaya et al. | |
| 2020/0260506 A1* | 8/2020 | Benson | H04W 72/04 |
| 2021/0212134 A1 | 7/2021 | Sternberg et al. | |
| 2021/0320897 A1 | 10/2021 | Stojanovski et al. | |
| 2024/0283791 A1* | 8/2024 | Salmela | H04L 63/0892 |

FOREIGN PATENT DOCUMENTS

WO    2020232404    11/2020

* cited by examiner

*Primary Examiner* — Jason E Mattis
*Assistant Examiner* — Bao G Nguyen
(74) *Attorney, Agent, or Firm* — Polsinelli P.C.

(57) ABSTRACT

An enterprise device identity proxy between an SMF and an Enterprise's device profile store supports N7 protocol for enterprise policy delivery between a central management service (CMS) and an enterprise policy service. In particular, when a user equipment (UE) requests a data service, the enterprise device identity proxy receives AAA transactions from the SMF running the enterprise policy service over a secondary authentication interface, stores the results in a data store, and uses business rules set forth by the CMS to transform Remote Authentication Dial-In User Service (RADIUS) Attribute Value Pairs (AVPs) into a valid N7 response to the SMF. The enterprise device identity proxy enables an enterprise to treat a device with cellular connectivity using the same rules that would apply to other access/connection types without the complexity and cost of deploying a 3GPP policy service to support N7 protocol for policy delivery.

20 Claims, 9 Drawing Sheets

ENTERPRISE DEVICE IDENTITY PROXY FOR EXTENDING ENTERPRISE DEVICE PROFILE

DESCRIPTION OF THE RELATED TECHNOLOGY

Fifth-generation (5G) mobile and wireless networks will provide enhanced mobile broadband communications and are intended to deliver a wider range of services and applications as compared to all prior generation mobile and wireless networks. Compared to prior generations of mobile and wireless networks, the 5G network architecture is service-based, meaning that wherever suitable, architecture elements are defined as network functions that offer their services to other network functions via common framework interfaces. The 5G networks or 5G core networks provide customers with higher data transfer speeds.

BRIEF DESCRIPTION OF THE DRAWINGS

To describe how the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1A:
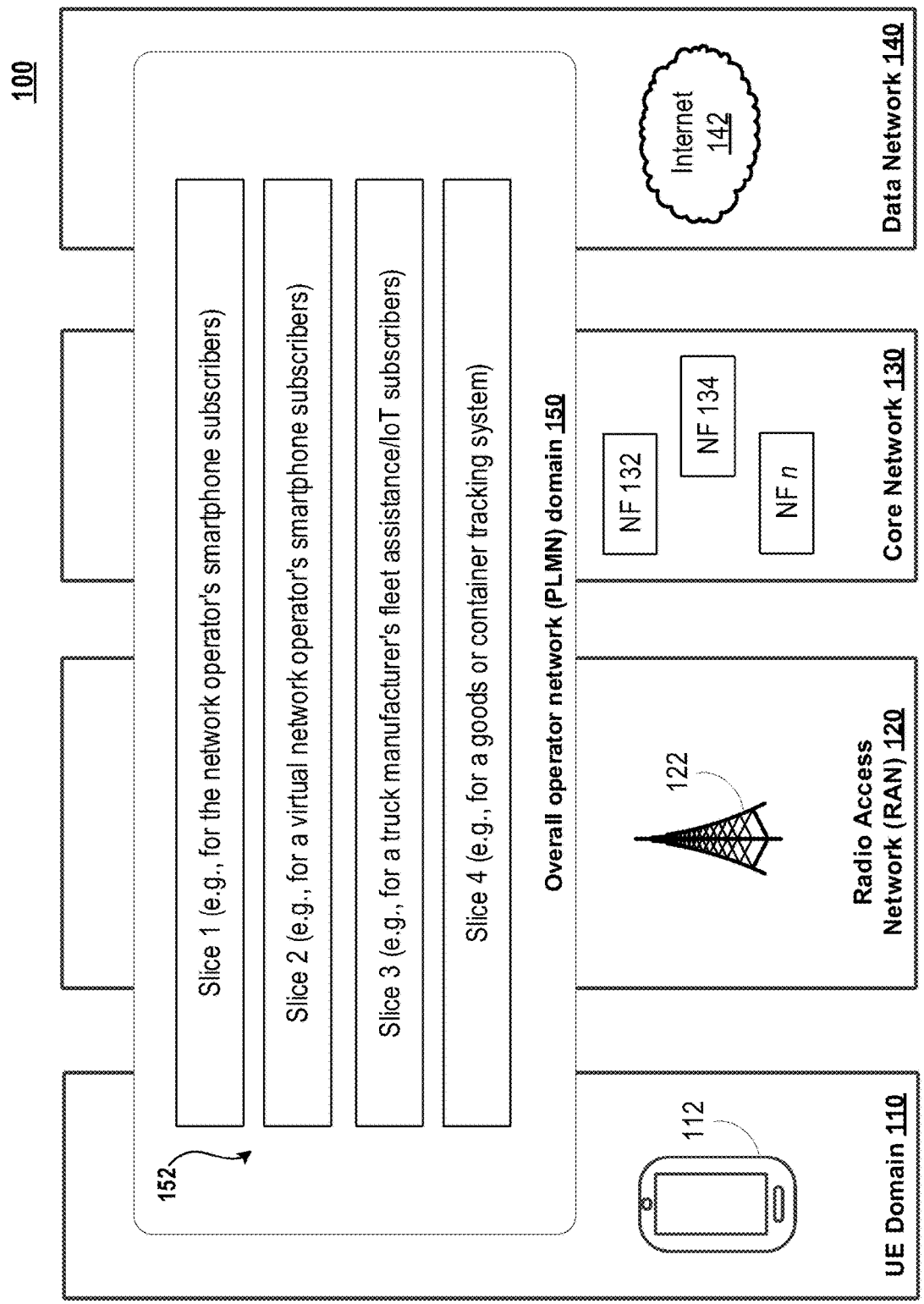
FIG. 1A depicts an example schematic representation of a 5G network environment in which network slicing has been implemented in accordance with some aspects of the disclosed technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained utilizing the instruments and combinations particularly pointed out in the appended claims. These and other features of the disclosure will become more fully apparent from the following description and appended claims or can be learned by the practice of the principles set forth herein.

The disclosed technology addresses the need in the art to provide improved support for the N7 protocol for enterprise policy delivery between a central management service and an enterprise policy service running on a function of a mobile network such as a Session Management Function ("SMF") to configure behavior of a user equipment device (UE) over a 5G network. In particular, the 5G infrastructure has two external interfaces that provide policies that determine aspects of device behavior on the network: an N7 interface (which connects the SMF to a Policy Control Function ("PCF")) and a secondary authentication interface (which connects SMF to an Authentication, Authorization, and Accounting ("AAA") service). Often these interfaces have various capabilities, and both interfaces are required to support the full set of features for a device (IP assignment over secondary auth, QoS, and L4/L7 rules over N7). Installing a dedicated 5G PCF for this support is not desirable due to increased CPU consumption as well as operational complexity and the cost for deployment of an enterprise 5G solution or a private 5G solution.

The present technology provides a solution to support the N7 protocol for enterprise policy delivery between the central management service and the enterprise policy service on the SMF in the form of an enterprise device identity proxy between the SMF and the Enterprise's device profile store, without requiring Third Generation Policy Partnership (3GPP) policy server functionalities. In particular, when the UE requests a data service, the enterprise device identity proxy receives transactions from the SMF running the enterprise policy service (such as AAA) over the secondary authentication interface, stores the results in a data store, and uses business rules set forth by a central management service to transform Remote Authentication Dial-In User Service (RADIUS) Attribute Value Pairs (AVPs) into a valid N7 response to the SMF (which occurs later in the session establishment call flow). The enterprise device identity proxy enables an enterprise to treat a device with cellular connectivity using the same rules (e.g., QoS, L4/L7, IP address pool assignment, network segmentation, etc.) that would apply to other access/connection types without expensive changes to the underlying device profile store to support N7 protocol for policy delivery.

Further, in some embodiments, the enterprise device identity proxy disclosed herein can be extended to a 4G network for enterprise policy delivery along a Gx interface Overview Various embodiments of a system and associated methods for providing improved support for an N7 protocol for enterprise policy delivery are disclosed herein. In one aspect, the present system provides an enterprise device identity proxy between a session management function and an enterprise policy service across an N7 interface of the network that receives a request for an enterprise policy from a session management function (SMF) by the enterprise device identity proxy, retrieves the enterprise policy from an enterprise policy service by the enterprise device identity proxy and transforms the enterprise policy into a valid N7 interface response to the SMF by the enterprise device identity proxy. In some embodiments, the enterprise device identity proxy retrieves a policy transformation from a data store, the data store including one or more policy transformations for one or more valid N7 interface responses for a plurality of enterprise policies configured on the enterprise policy service. In some embodiments, the enterprise device identity proxy provides the policy transformation to the data store by a centralized management system, wherein the policy transformation dictates how one or more attributes present in the enterprise policy is transformed into N7 attributes. In some embodiments, the enterprise device identity proxy updates the policy transformation at the data store by the centralized management system and provides the enterprise policy across one or more network technologies. In one aspect, the enterprise device identity proxy receives a N7 request from the SMF by the enterprise device identity proxy and responds to the N7 request with the valid N7 interface response that is effective to implement the enterprise policy in a session wherein access is provided by a 5G core network. In another aspect, the request for the enterprise policy from the SMF is a request for secondary authentication. In some embodiments, the enterprise policy service is a Remote Authentication Dial-In User Service (RADIUS). Further, in some embodiments, the enterprise policy is represented as one or more Attribute Value Pairs (AVPs), wherein the AVPs are transformed into the valid N7 interface response by the enterprise device identity proxy. In some embodiments, the enterprise policy includes at least one of: a quality of service (QoS) policy; a Layer 4/Layer 7 policy; a network segmentation policy and/or an IP address pool assignment policy. Further, in one aspect, the enterprise policy includes a differentiated treatment of network traffic having a Differentiated Services Field Codepoint (DSCP), and wherein the valid N7 interface response includes one or more instructions that cause a processor in communication with the SMF to mark one or more data packets with a DSCP value, whereby the enterprise policy can be applied at an enterprise network node existing outside the 5G core network.

In another aspect, the enterprise device identity proxy can be implemented on a 4G network, a 3GPP network, an LTE network, and/or an EPC network.

Example Embodiments

Figure 1B:
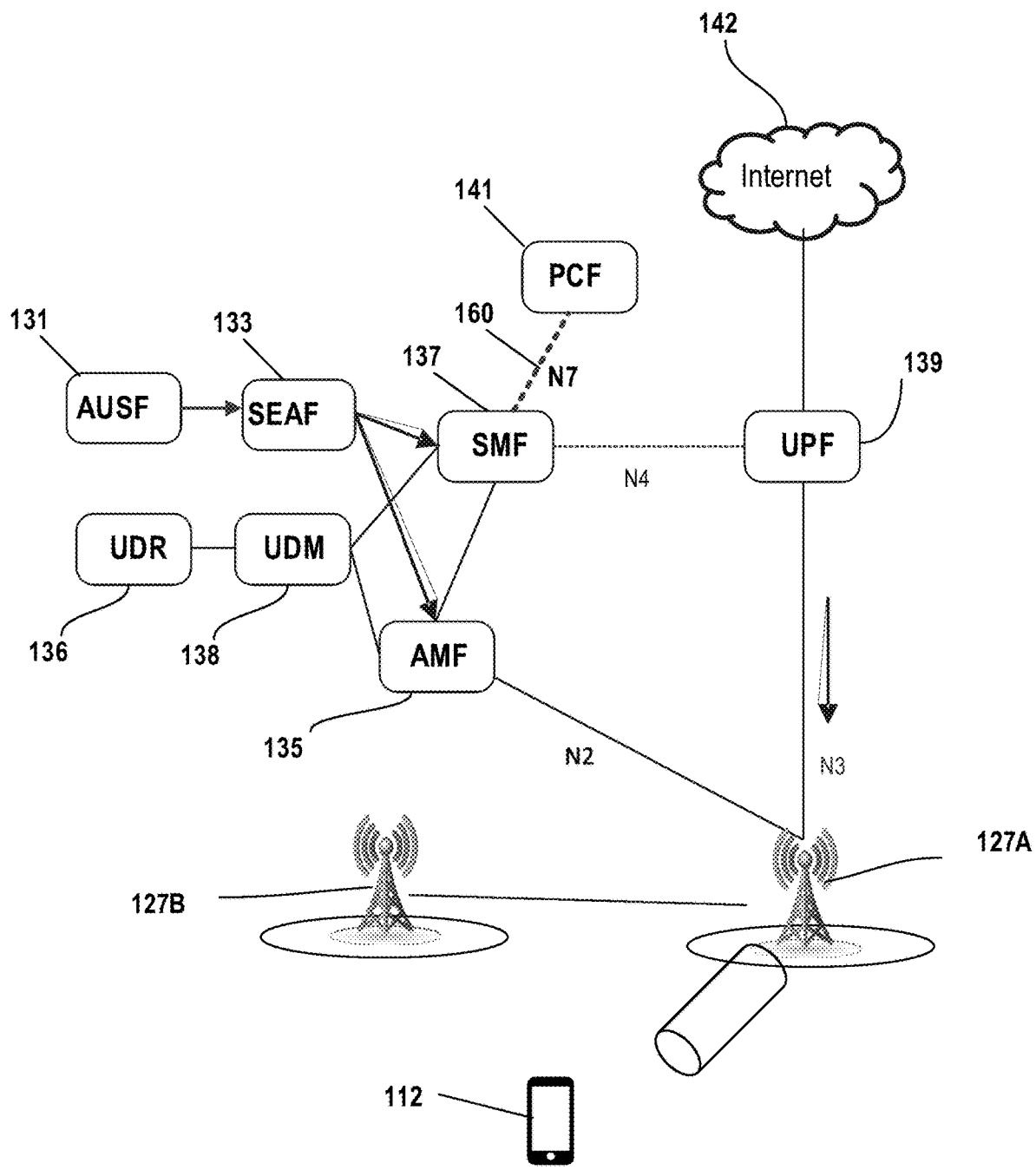
FIG. 1B illustrates an example 5G network architecture in accordance with some aspects of the disclosed technology.

Descriptions of network environments and architectures for network data access and services, as illustrated in FIGS. 1A and 1B, are first disclosed herein. A discussion of the systems and methods for providing improved support for the N7 protocol for enterprise policy delivery over a 5G network will then be discussed with reference to FIGS. 2-3C. The discussion then concludes with a brief description of example devices, as illustrated in FIG. 4. These variations shall be described herein as the various embodiments are set forth. The disclosure now turns to FIG. 1A.

FIG. 1A depicts an exemplary schematic representation of a 5G network environment in which network slicing has been implemented, and in which one or more aspects of the present disclosure may operate, according to some aspects of the present disclosure.

As illustrated, network environment 100 is divided into four domains, each of which will be explained in greater depth below; a User Equipment (UE) domain 110, e.g. of one or more enterprises, in which a plurality of user cellphones or other connected devices 112 reside; a Radio Access Network (RAN) domain 120, in which a plurality of radio cells, base stations, towers, or other radio infrastructure 122 resides; a Core Network 130, in which a plurality of Network Functions (NFs) 132, 134, . . . , n reside; and a Data Network 140, in which one or more data communication networks such as the Internet 142 reside. Additionally, the Data Network 140 can support SaaS providers configured to provide SaaSs to enterprises, e.g. to users in the UE domain 110.

Core Network 130 contains a plurality of Network Functions (NFs), shown here as NF 132, NF 134 . . . NF n. In some example embodiments, a core network 130 is a 5G core network (5GC) in accordance with one or more accepted 5GC architectures or designs. In some example embodiments, the core network 130 is an Evolved Packet Core (EPC) network, which combines aspects of the 5GC with existing 4G networks and includes a Gx interface rather than an N7 interface for policy delivery. Regardless of the particular design of core network 130, the plurality of NFs typically executes in a control plane of the core network 130, providing a service-based architecture in which a given NF allows any other authorized NFs to access its services. For example, a Session Management Function (SMF) controls session establishment, modification, release, etc., and in the course of doing so, provides other NFs with access to these constituent SMF services.

In some example embodiments, the plurality of NFs of the core network 130 can include one or more Access and Mobility Management Functions (AMF), (typically used when core network 130 is a 5GC network) and Mobility Management Entities (MME), (typically used when core network 130 is an EPC network), collectively referred to herein as an AMF/MME for purposes of simplicity and clarity. In some example embodiments, an AMF/MME can be common to or otherwise shared by multiple slices of the plurality of network slices 152, and in some example embodiments an AMF/MME can be unique to a single one of the plurality of network slices 152.

Similarly, the remaining NFs of the core network 130 can be shared amongst one or more network slices or provided as a unique instance specific to a single one of the plurality of network slices 152. In addition to NFs including an AMF/MME as discussed above, the plurality of NFs of the core network 130 can include one or more of the following: User Plane Functions (UPFs); Policy Control Functions (PCF s); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art. Note that a 4G network and/or an EPC network described above would include a Policy and Charging Rules Function (PCRF) rather than a PCF.

Across the four domains of the 5G network environment 100, an overall operator network domain 150 is defined. The operator network domain 150 is in some example embodiments a Public Land Mobile Network (PLMN), a private 5G network and/or a 5G enterprise network, and can be thought of as the carrier or business entity that provides cellular service to the end-users in UE domain 110. Within the operator network domain 150, a plurality of network slices 152 are created, defined, or otherwise provisioned to deliver the desired set of defined features and functionalities, e.g. SaaSs, for a certain use case or corresponding to other requirements or specifications. Note that network slicing for the plurality of network slices 152 is implemented in an end-to-end fashion, spanning multiple disparate technical and administrative domains, including management and orchestration planes (not shown). In other words, network slicing is performed from at least the enterprise or subscriber edge at UE domain 110, through the Radio Access Network (RAN) 120, through the 5G access edge and the 5G core network 130, and to the data network 140. Moreover, note that this network slicing may span multiple different 5G providers.

For example, as shown here, the plurality of network slices 152 include Slice 1, which corresponds to smartphone subscribers of the 5G provider who also operates network domain, and Slice 2, which corresponds to smartphone subscribers of a virtual 5G provider leasing capacity from the actual operator of network domain 150. Also shown is Slice 3, which can be provided for a fleet of connected vehicles, and Slice 4, which can be provided for an IoT goods or container tracking system across a factory network or supply chain. Note that the network slices 152 are provided for purposes of illustration, and in accordance with the present disclosure, and the operator network domain 150 can implement any number of network slices as needed, and can implement these network slices for purposes, use cases, or subsets of users and user equipment in addition to those listed above. Specifically, the operator network domain 150 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G network architecture is service-based, meaning that wherever suitable, architecture elements are defined as network functions that offer their services to other network functions via common framework interfaces. To support this wide range of services and network functions across an ever-growing base of user equipment (UE), networks incorporate the network slicing concept utilized in previous generation architectures.

Within the scope of the 5G mobile and wireless network architecture, a network slice includes a set of defined features and functionalities that together form a complete Public Land Mobile Network (PLMN), a private 5G network and/or a 5G enterprise network for providing services to UEs. This network slicing permits for the controlled composition of the network with the specific network functions and provided services that are required for a specific usage scenario. In other words, network slicing enables a 5G network operator to deploy multiple, independent 5G networks where each is customized by instantiating only those features, capabilities, and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g. based on requirements of the services, to the enterprise.

Associating SaaSs and SaaS providers with network slices used to provide the SaaSs to enterprises can facilitate efficient management of SaaS provisioning to the enterprises. Specifically, it is desirable for an enterprise/subscriber to associate already procured SaaSs and SaaS providers with network slices being used to provision the SaaSs to the enterprise. However, associating SaaSs and SaaS providers with network slices is extremely difficult to achieve without federation across enterprises, network service providers, e.g. 5G service providers, and SaaS providers.

FIG. 1B illustrates an example 5G network architecture. As addressed above, a User Equipment (UE) 112 can connect to a radio access network provided by a first gNodeB (gNB) 127A or a second gNB 127B.

The gNB 127A can communicate over a control plane N2 interface with an access mobility function (AMF) 135. AMF 135 can handle tasks related to network access through communication with unified data management (UDM) function 138 which accesses a user data repository (URD) 136 that can contain user data such as profile information, authentication information, etc. Collectively AMF 135 and UDM 138 can determine whether a UE should have access and any parameters on access. AMF 135 also works with SEAF 133 to handle authentication and re-authentication of the UE 112 as it moves between access networks. The SEAF and the AMF could be separated or co-located.

Assuming AMF 135 determines the UE 112 should have access to a user plane to provide voice or data communications, AMF 135 can select one or more functions of a mobile network including session management functions (SMF) 137. SMF 137 can configure and control one or more user plane functions (UPF) 139. Control plane communications between the SMF 137 and the gNB 127A (or 127B) also need to be encrypted. SEAF 133 can derive a security key from communications with authentication service function (AUSF) 131 to provide the security key to SMF 137 for use in encrypting control plane communications between the SMF 137 and the gNB 127A (or 127B).

As noted above SMF 137 can configure and control one or more user plane functions (UPF) 139. The configuration of the UPFs can be in accordance with one or more policies defined by policy control function (PCF). The SMF 137 and the PCF 141 communicate over an N7 interface 160.

SMF 137 communicates with UPF 139 over an N4 Interface which is a bridge between the control plane and the user plane. SMF 137 can send PDU session management and traffic steering and policy rules to UPF 139 over the N4 interface. UPF 139 can send PDU usage and event reporting to SMF 137 over the N4 interface.

UPF 139 can communicate user plane data or voice over the N3 interface back to UE 112 through gNB 127A. There can be any number of UPFs handling different user plane services. Most commonly there would be at least one UPF for data service and at least one UPF for voice service.

By implementing UPF at each gNB, many UPF instances are in a single deployment, which complicates the UE IP address management and user plane data forwarding. Typically, a UE IP address pool is maintained by SMF, which allocates an IP address to a UE during UE Registration/PDU (Protocol Data Unit) session establishment process. SMF then configures UPF with traffic classification rules and traffic policies for the IP address. UPF acts as a router for the subnet allocated to the UE. IGP/BGP protocols can be used to publish these routes into the network. When the traffic for the UE is received from the network, the traffic is classified and the IP payload alone is forwarded to the gNB where the UE is connected over a GTPu tunnel. Similarly, when data are received in an uplink over the GTPu tunnel, UPF appends a MAC header and routes the data to the next hop. In the context of local UPF collocated at a gNB, maintaining one UE IP address pool per gNB will not be scalable and manageable as multiple gNBs exist in a facility. Routing/Packet forwarding would have similar implications.

Figure 2:
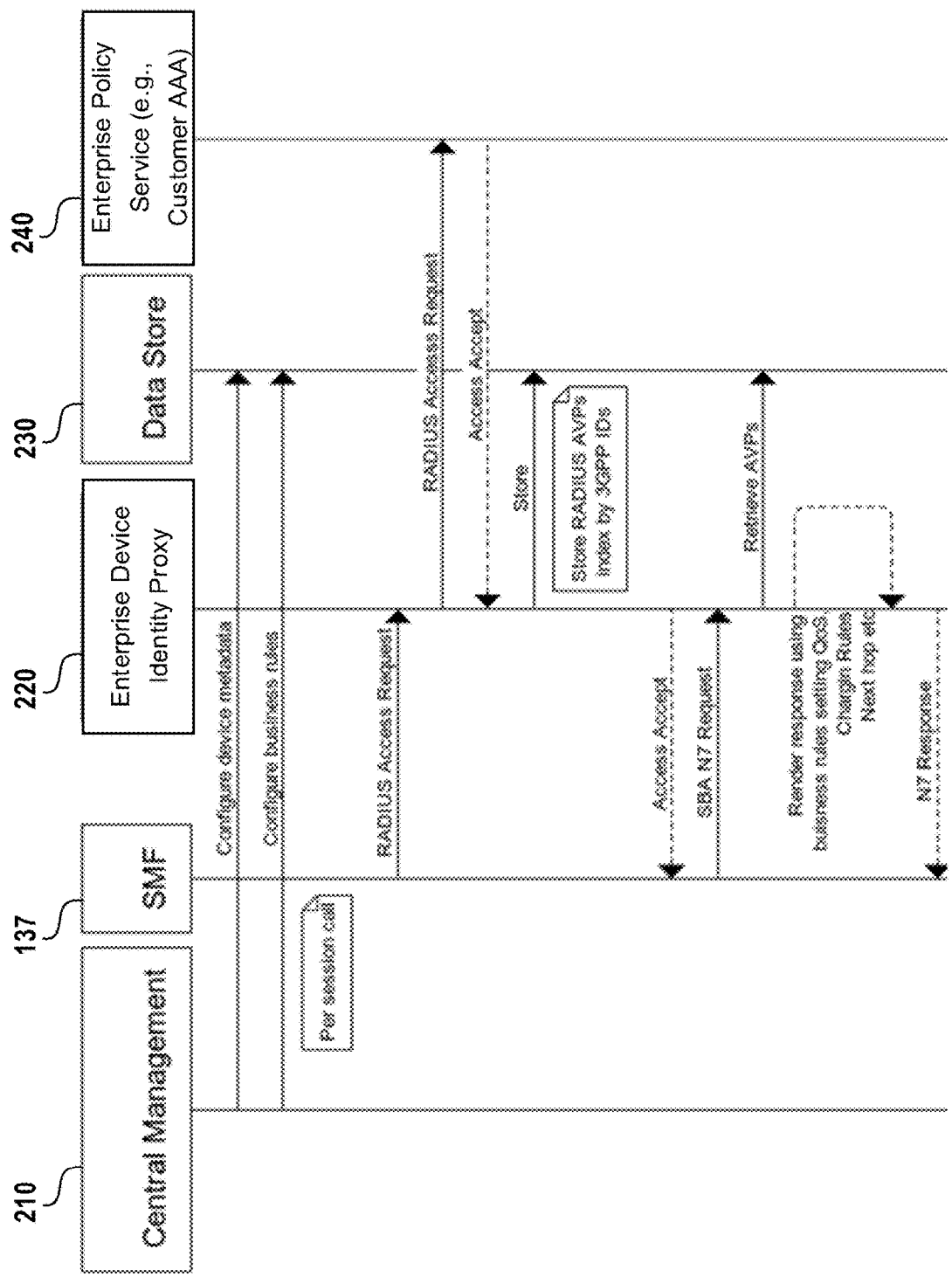
FIG. 2 is a sequence diagram that illustrates data flow and communication between various components of a 5G network environment and an Enterprise Device Identity Proxy in accordance with some aspects of the disclosed technology.

Referring to FIG. 2, a sequence diagram is provided that illustrates an enterprise device identity proxy (enterprise device identity proxy) 220 between a function of a mobile network such as a 3rd Generation Partnership Project (3GPP) SMF 137 and an Enterprise's device profile store ("data store") 230 along an N7 interface (N7 interface 160 in FIG. 1B) of a 5G network. When the UE 112 requests a data service, the enterprise device identity proxy 220 receives an enterprise policy over a secondary authentication interface from the SMF 137 running an enterprise policy service 240, stores the results in the data store 230, and uses business rules set forth by a central management service 210 to transform the enterprise policy from a service-specific format into a valid N7 format understandable by the SMF 137 so that the 5G core network or a subsequent hop in the enterprise network can apply the enterprise policy. The purpose of the SMF 137 is to set up the User Plane Function (UPF) 139 (FIG. 1B), which communicates with the UE 112 and provides a network-connected service. However, communications between the UPF 139 and the UE 112 should comply with various enterprise policies set in place by an enterprise, such as a corporation or other managing body. The enterprise device identity proxy 220 allows an enterprise to treat a device with cellular connectivity using the same rules that would apply to other access/connection types without expensive changes to the underlying device profile store 230 to support the N7 protocol for policy delivery.

The centralized management system 210 (such as a cloud service) provides business rules for the N7 response to the SMF 137. These business rules determine how the attributes present in an enterprise policy are transformed into valid N7 attributes. These business rules are provided out-of-band to the enterprise device identity proxy 220 and can change over time or vary between specific enterprise applications. For example, if new device groups are added to support high speed/low latency devices, the enterprise updates its policies accordingly. The enterprise device identity proxy 220 translates an enterprise policy into a valid N7 interface response, where the original enterprise policy that may be in syntax that is not understandable by the SMF 137, or the enterprise policy may not be supported by the 5G core network so that changes do not need to be made to the underlying device profile store 230 each time the enterprise policy changes.

As shown in FIG. 2, the centralized management system 210 initially configures device metadata and business rules across the network to an Enterprise's device profile store ("data store") 230. For a session call, the SMF 137 performs a secondary authentication procedure when it transmits an access request message to the enterprise device identity proxy 220, which forwards the access request message to the enterprise policy service 240. In some embodiments, the access request message can be a Remote Authentication Dial-In User Service (RADIUS) access request message, and the enterprise policy service 240 can include an Authentication, Authorization and Accounting (AAA) service. The enterprise policy service 240 responds to the access request with an "access accept" response that is received at the enterprise device identity proxy 220. The "access accept" response includes the enterprise policy to be applied to the session established over the 5G core network between the UE 112 and the particular enterprise policy service 240 running on the SMF 137. In one example, the enterprise policy includes one or more RADIUS Attribute Value Pairs (AVPs) and one or more 3GPP IDs descriptive of the enterprise policy. The enterprise device identity proxy 220 stores the received enterprise policy in the data store 230 for use when the SMF 137 later makes in N7 interface request, and forwards the "access accept" message to the SMF 137 to complete the secondary authentication.

After completing the secondary authentication, the SMF 137 initiates an N7 request to get session management policies. The enterprise device identity proxy 220 receives this N7 request and retrieves the previously stored enterprise policy, which can include one or more AVPs, from the data store 230. The enterprise device identity proxy first transforms the enterprise policy from the data store 230 into a valid N7 interface response based on the business rules provided by the centralized management system 210. As discussed, these business rules and resultant transformations are specific to the application and are expected to vary widely between customers, and can involve translating the syntax of the enterprise policy into one which is understandable by the SMF 137 or one which is otherwise supported by the 5G core network. Once transformed, the enterprise device identity proxy 220 sends the enterprise policy, now in the form of a valid N7 interface response, to the SMF 137. The 5G core network, or a subsequent hop in the enterprise network can then apply the enterprise policy now that it has been transformed into a compatible format. Following the receipt of the valid N7 interface response, the SMF 137 configures the UPF 139 itself or communications between the UE 112 and the UPF 139 to comply with the enterprise policy outlined by the enterprise policy service 240 running on the SMF 137.

Figure 3A:
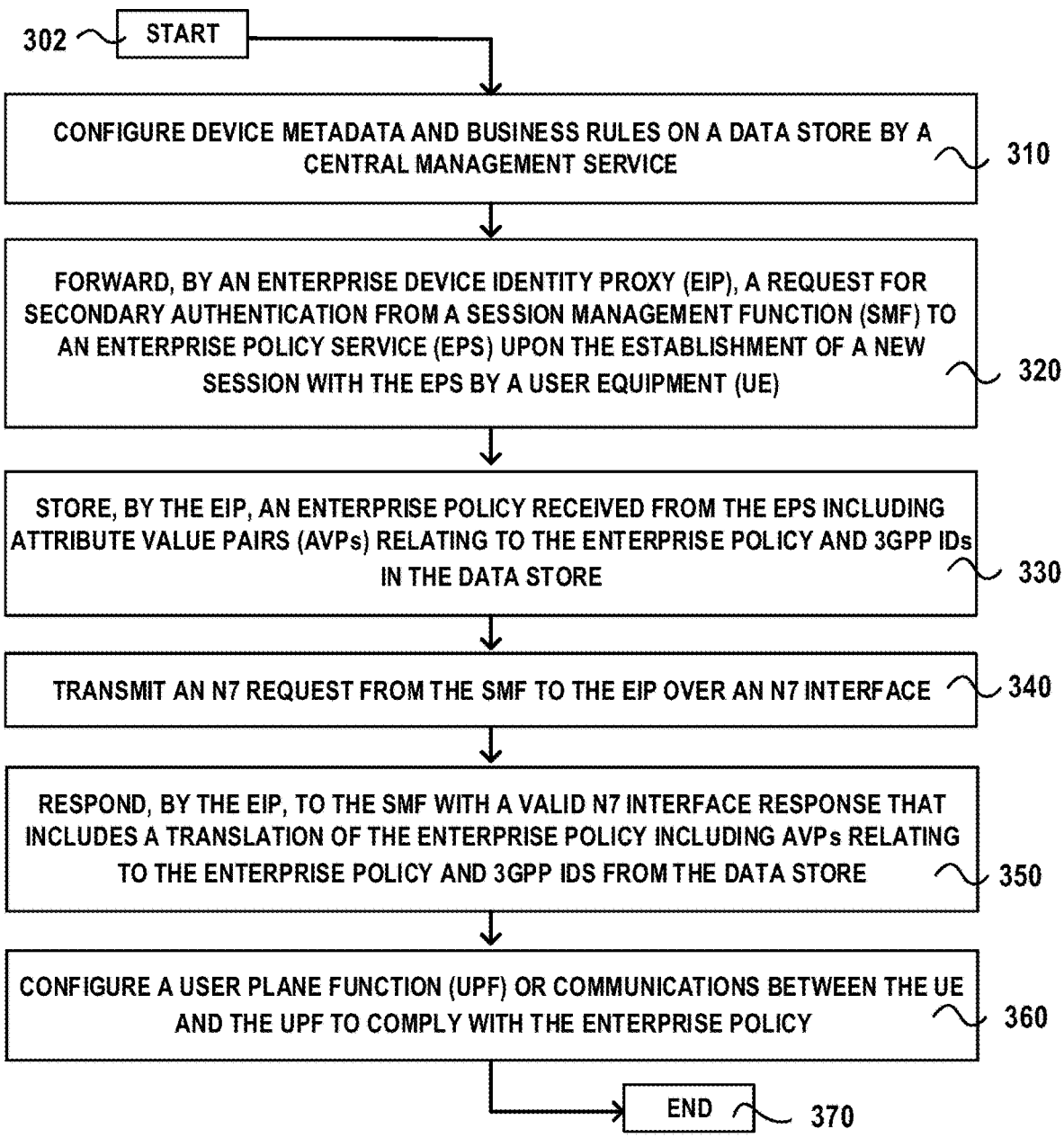
FIG. 3A, FIG. 3B, and FIG. 3C are a series of process flows that show an overall process for facilitating communication between a 3rd Generation Partnership Project (3GPP) session management function (SMF) component of a 5G network environment and a device profile store of an Enterprise network in communication with the 5G network environment in accordance with some aspects of the disclosed technology.
Figure 3B:
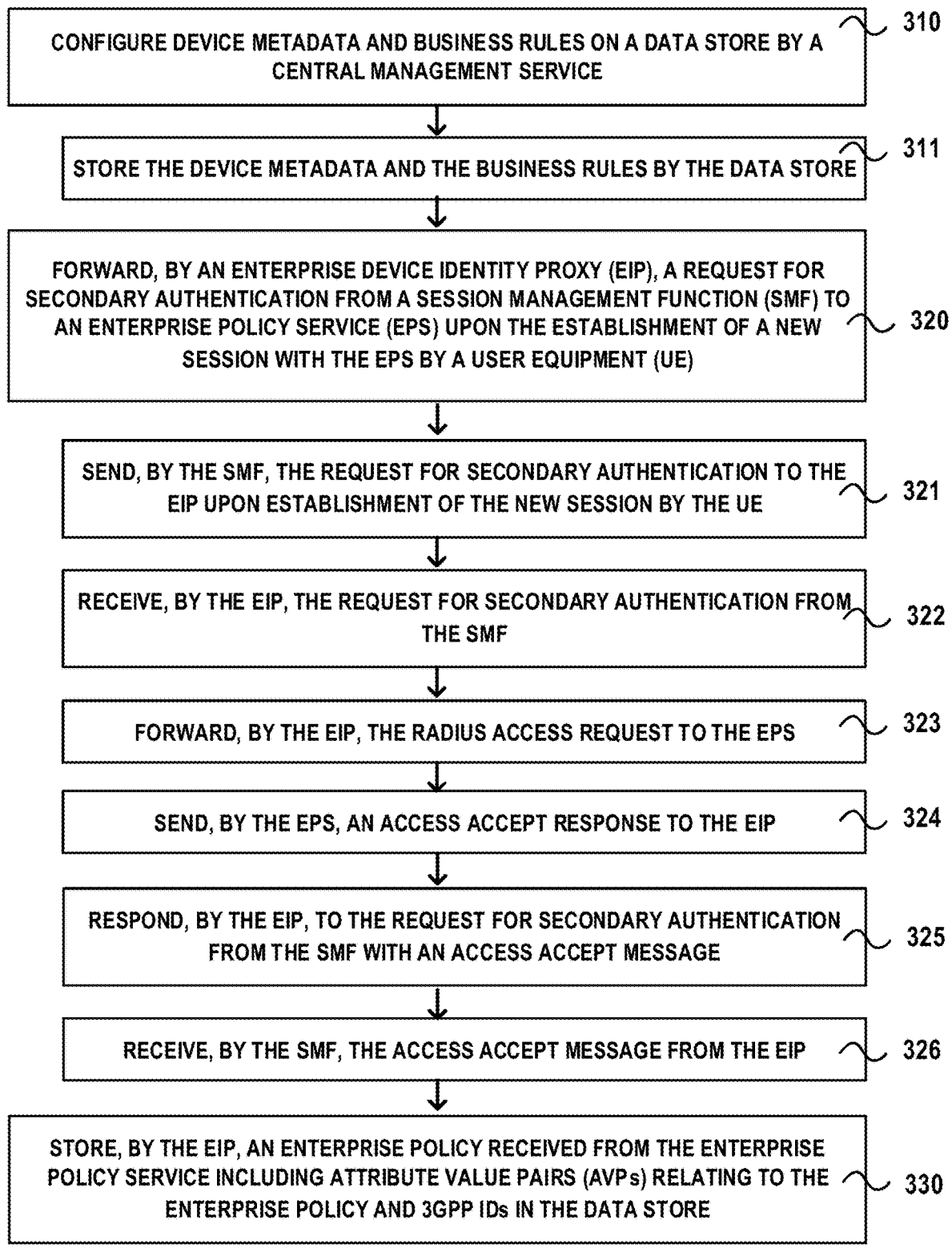
Figure 3C:
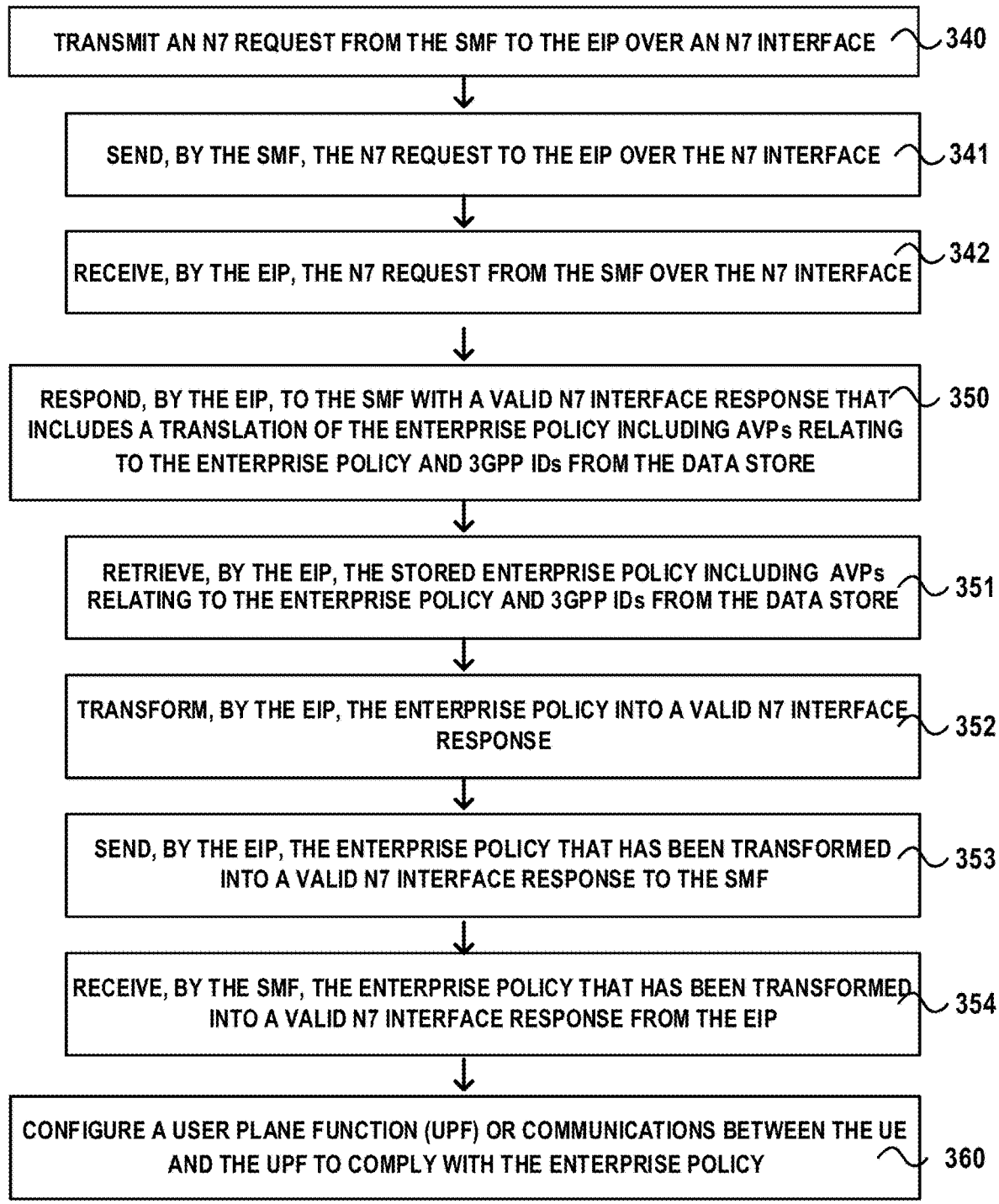
Figure 4:
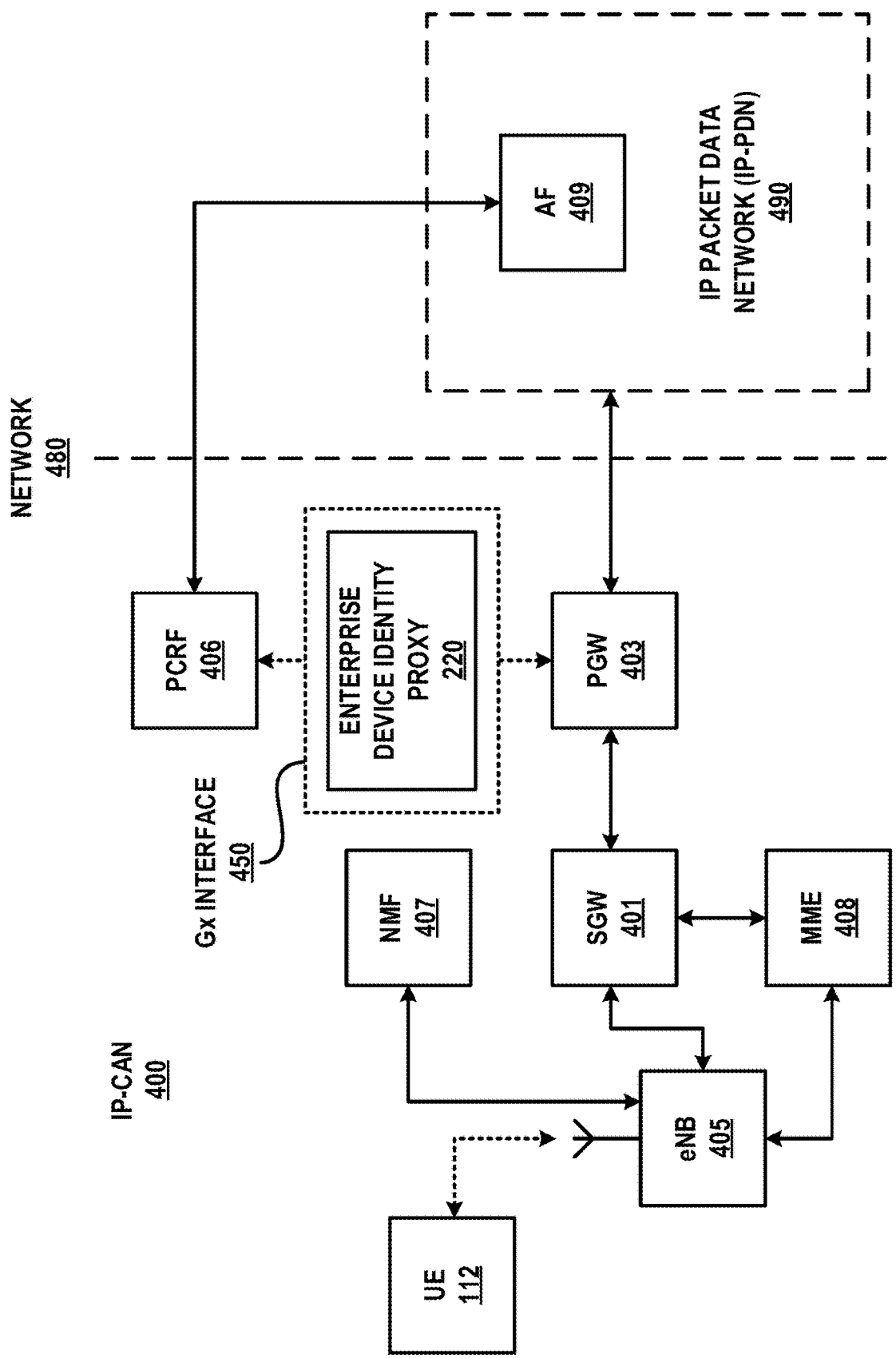
FIG. 4 illustrates an example 4G/3GPP network architecture in accordance with some aspects of the disclosed technology.

FIGS. 3A-3C illustrates an example method 300 for transforming an enterprise policy from a service-specific format into a valid N7 format understandable by the SMF so that the 5G core network or a subsequent hop in the enterprise network can apply the enterprise policy. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some examples, the method includes configuring device metadata and business rules on a data store by a central management service at step 310. For example, the central management service 210 illustrated in FIG. 2 can configure device metadata and business rules on the data store 230. Step 310 can include one or more sub-steps, including step 311, shown in FIG. 3B, where the data store 230 stores both the device metadata and the business rules. The device metadata identifies various enterprise policies that should be applied based on the device metadata, and the business rules dictate transformations of the enterprise policies into a particular network context, which is in some embodiments a 5G core network.

Further, according to some examples outlined herein, the method includes forwarding, by an enterprise device identity proxy, a request for secondary authentication from a function of a mobile network such as a session management function (SMF) to an enterprise policy service that runs on the SMF upon the establishment of a new session with the enterprise policy service by the UE at step 320. For example, with reference to FIG. 2, the enterprise device identity proxy 220 forwards a request for secondary authentication from the SMF 137 to the enterprise policy service 240, which can in some embodiments be an Authentication, Authorization and Accounting (AAA) service. As discussed above, the enterprise device identity proxy 220 is a proxy service to the enterprise policy service 240 running on the SMF 137 that stores and provides enterprise policies to devices as they establish sessions with enterprise network resources provided by the enterprise policy service 240, such as the AAA service. Step 320 can include a plurality of sub-steps shown in FIG. 3B including sending, by the SMF 137, the request for secondary authentication to the enterprise device identity proxy 220 upon establishment of the new session by the UE 112 (shown in FIG. 1A) at step 321. In the example provided, the request for secondary authentication is a Remote Authentication Dial-In User Service (RADIUS) request message. At step 322, the enterprise device identity proxy 220 receives the request for secondary authentication from the SMF 137. At step 323, the enterprise device identity proxy 220 forwards the request for secondary authentication to the enterprise policy service 240. At step 324, the enterprise policy service 240 sends an "access accept" response back to the enterprise device identity proxy 220. It is important to note that the "access accept" response includes an enterprise policy to be applied to the session established over the 5G core network between the UE and the particular service, i.e. the enterprise policy service 240 running on the SMF 137. The enterprise policy can include AVPs and 3GPP IDs relating to the enterprise policy. At step 325, the enterprise device identity proxy 220 responds to the request for secondary authentication from the SMF 137 by forwarding the "access accept" response to the SMF 137. At step 326, the SMF 137 receives the "access accept" response from the enterprise device identity proxy 220.

The method further includes at step 330 storing, by the enterprise device identity proxy, data indicative of the enterprise policy received from the enterprise policy service including the AVPs and 3GPP IDs relating to the enterprise policy in the data store. With continued reference to FIG. 2, the enterprise device identity proxy 220 stores the enterprise policy received from the enterprise policy service 240, including the AVPs and 3GPP IDs relating to the enterprise policy in the data store 230. To reiterate, the access accept response can include an enterprise policy to be applied to the session established over the 5G core network. It should be noted that step 330 can be performed during or after step 320, particularly following step 325.

The method includes step 340, which outlines transmitting an N7 request between the SMF and the enterprise device identity proxy over an N7 interface. In particular, with additional reference to FIGS. 1B and 2, step 341 includes sending, by the SMF 137, the N7 request to the enterprise device identity proxy 220 over the N7 interface 160. The N7 request can include a request for session management policies. The enterprise device identity proxy 220 can translate the policy it received from the AAA server into a form that is understandable to the SMF 137 when received over the N7 interface in response to the N7 request. In some embodiments, the enterprise policy is translated in such way that the 5G core network can interpret the policy, even if that interpretation is to include data or packet formatting such that a subsequent hop in the enterprise network can apply the enterprise policy. Subsequently step 342 outlines receiving, by the enterprise device identity proxy 220, the N7 request from the SMF 137 over the N7 interface 160.

The method further provides step 350, which includes responding, by the enterprise device identity proxy, to the SMF with a valid N7 response that includes a translation of the enterprise policy including AVPs relating to the enterprise policy and 3GPP IDs from the data store, the enterprise policy having been translated into the valid N7 response. With continued reference to FIGS. 1B and 2, the enterprise device identity proxy 220 responds to the SMF 137 across the N7 interface 160 with a valid N7 response that includes the translation of the enterprise policy including AVPs relating to the enterprise policy and 3GPP IDs from the data store 230. Step 350 includes various sub-steps, including step 351 in which the enterprise device identity proxy 220 retrieves the stored enterprise policy including AVPs relating to the enterprise policy and 3GPP IDs from the data store 230. To reiterate, the enterprise policy was previously received by the enterprise device identity proxy 220 from the enterprise policy service 240 during step 320 in response to the request for secondary authentication, and subsequently stored in the data store 230 during step 330 by the enterprise device identity proxy 220. Step 352 includes transforming the enterprise policy into a valid N7 interface response by the enterprise device identity proxy 220. In particular, the enterprise device identity proxy 220 is configured to translate the enterprise policy into a valid N7 interface response, where the original enterprise policy may be in syntax that is not understandable by the SMF 137 or the enterprise policy may not be supported by the 5G core network. In some embodiments, the translation guidelines are provided from the central management service 210 through the business rules which were previously stored in the data store 230 during step 310. Step 353 involves sending, by the enterprise device identity proxy 220, the enterprise policy that has been transformed into a valid N7 interface response to the SMF 137, whereby the 5G core network, or a subsequent hop in the enterprise network can apply the enterprise policy. Step 354 includes receiving, by the SMF 137, the enterprise policy that has been transformed into a valid N7 interface response from the enterprise device identity proxy 220.

The method further includes step 360, in which the SMF configures a UPF or otherwise communications between the UE and the UPF to comply with the enterprise policy. With additional reference to FIGS. 1A-2, the SMF 137 configures the UPF 139 or communications between the UE 112 and the UPF 139 to comply with the enterprise policy. Since the enterprise policy has been translated into a compatible format, the UE 112 and the UPF 139 can communicate with one another in a way that complies with the enterprise policy required by the enterprise.

It will be understood by those of ordinary skill in the art that although the SMF receives a valid response over the N7 interface, it does not mean that the entire enterprise policy can be applied by the UPF or 5G core network. But the SMF can configure the UPF as required by the translated policy. In many cases this might make it so that data going to or coming from the UPF can be tagged in a way that the rest of the enterprise network (outside of the 5G core network) can apply the enterprise policy.

In some embodiments, the enterprise device identity proxy 220 can be extended to a 4G network, a 3GPP network, and/or an LTE network. FIG. 4 illustrates a conventional $3^{rd}$ Generation Partnership Project Long-Term Evolution (3GPP LTE) network 480 which can similarly implement the enterprise device identity proxy 220 to configure behavior of the UE 112 over the network 480. The network 480 includes an Internet Protocol (IP) Connectivity Access Network (IP-CAN) 400 and an IP Packet Data Network (IP-PDN) 490. The IP-CAN 400 generally includes various functions of the mobile network including: a serving gateway (SGW) 401 in communication with a packet data network (PDN) gateway (PGW) 403; a policy and charging rules function (PCRF) 406 in communication with the PGW 403 over a Gx interface 450; a network management function (NMF) 407; a mobility management entity (MME) 408 and EUTRAN Node B (eNB) 405 (i.e., base station, for the purposes herein the terms base station and eNB are used interchangeably). Although not shown, the IP-PDN 490 portion of the EPS may include application or proxy servers, media servers, email servers, etc. With additional reference to the 5G network illustrated in FIG. 1B, for the purposes of this application, the functions of the network including the PGW 403 can be considered analogous to the SMF 137, the PCRF 406 can be considered analogous to the PCF 141, and the Gx interface 450 can be considered analogous to the N7 interface 160. As such, for 4G/LTE/3GPP, the enterprise device identity proxy 220 can similarly be implemented along the Gx interface 450 between the PGW 403 and the PCRF 406 to enable an enterprise to treat the UE 112 with cellular connectivity using the same rules that would apply to other access/connection types without expensive changes to the underlying device profile store.

Within the IP-CAN 400, the eNB 405 is part of what is referred to as an Evolved Universal Mobile Telecommunications System (UMTS) Terrestrial Radio Access Network (EUTRAN), and the portion of the IP-CAN 400 including the SGW 401, the PGW 403, the PCRF 406, the NMF 407 and the MME 408 is referred to as an Evolved Packet Core (EPC). Although only a single eNB 405 is shown in FIG. 4, it should be understood that the EUTRAN may include any number of eNBs. Similarly, although only a single SGW, PGW and MME are shown in FIG. 4, it should be understood that the EPC may include any number of these core network elements.

The eNB 405 provides wireless resources and radio coverage for one or more UEs 112. That is to say, any number of UEs 112 may be connected (or attached) to the eNB 405. The eNB 405 is operatively coupled to the SGW 401, the NMF 407, and the MME 408.

The SGW 401 routes and forwards user data packets, while also acting as the mobility anchor for the user plane during inter-eNB handovers of UEs. The SGW 401 also acts as the anchor for mobility between $3^{rd}$ Generation Partnership Project Long-Term Evolution (3GPP LTE) and other 3GPP technologies. For idle UEs 112, the SGW 401 terminates the downlink data path and triggers paging when downlink data arrives for UEs 112.

The PGW 403 provides connectivity between UE 112 and the external packet data networks (e.g., the IP-PDN) by being the point of entry/exit of traffic for the UE 112. As is known, a given UE 112 may have simultaneous connectivity with more than one PGW 403 for accessing multiple PDNs.

The PGW 403 also performs policy enforcement, packet filtering for UEs 112, charging support, lawful interception and packet screening, each of which are well-known functions. The PGW 403 also acts as the anchor for mobility upon SGW relocation during handovers within LTE network, as well as between 3GPP and non-3GPP technologies, such as Worldwide Interoperability for Microwave Access (WiMAX) and $3^{rd}$ Generation Partnership Project 2 (3GPP2 (code division multiple access (CDMA) 1× and Enhanced Voice Data Optimized (EvDO)). For the purposes of this application, the PGW 403 can be considered analogous to the SMF 137 of the 5G network of FIG. 1B. The PGW 403 communicates with the PCRF 406 over the Gx interface 450 in a manner similar to how the PCF 141 and the SMF 137 communicate over the N7 interface 160.

Still referring to FIG. 4, eNB 405 is also operatively coupled to the MME 408. The MME 408 is the control-node for the EUTRAN, and is responsible for idle mode UE 112 paging and tagging procedures including retransmissions. The MME 408 is also responsible for choosing a particular SGW for a UE during initial attachment of the UE to the network, and during intra-LTE handover involving Core Network (CN) node relocation. The MME 408 authenticates UEs 112 by interacting with a Home Subscriber Server (HSS), which is not shown in FIG. 4.

Non Access Stratum (NAS) signaling terminates at the MME 408, and is responsible for generation and allocation of temporary identities for UEs 112. The MME 408 also checks the authorization of a UE 112 to camp on a service provider's Public Land Mobile Network (PLMN), and enforces UE 112 roaming restrictions. The MME 408 is the termination point in the network for ciphering/integrity protection for NAS signaling, and handles security key management.

The MME 408 also provides control plane functionality for mobility between LTE and 2G/3G access networks with an S3 type of interface from the SGSN (not shown) terminating at the MME 408. The network management function (NMF) 407 is the entity that controls operations of the Radio Access Network.

The Policy and Charging Rules Function (PCRF) 406 is the entity that makes policy decisions and sets charging rules. It has access to subscriber databases and plays a role in the 3GPP architecture as specified in 3GPP TS 23.203 "Policy and Charging Control Architecture." For the purposes of this application, the PCRF 406 can be considered analogous to the PCF 141 of the 5G network of FIG. 1B. The PCRF 406 communicates with the PGW 403 over the Gx interface 450 in a manner similar to how the PCF 141 and the SMF 137 communicate over the N7 interface 160.

The IP-PDN 490 may include an application function (AF) 409. The Application Function (AF) 409 is an entity that is application aware and is an ultimate receiver of exported eNB data that may be used to more effectively deliver content to the UE 112 to improve and/or optimize the network 480. AF 409 may alternatively or additionally be positioned inside the UE 112.

In further reference to FIG. 4 and with additional reference to FIG. 2, when the UE 112 requests a data service, the enterprise device identity proxy 220 receives an enterprise policy over a secondary authentication interface from a function of the mobile network, which is in some embodiments the PGW 403 running an enterprise policy service such as enterprise policy service 240, stores the results in a data store such as data store 230, and uses business rules set forth by a central management service such as central management service 210 to transform the enterprise policy from a service-specific format into a valid Gx format understandable by the PGW 403 so that the network 480 or a subsequent hop in the enterprise network can apply the enterprise policy. Communications between the AF 409 and the UE 112 should comply with various enterprise policies set in place by an enterprise, such as a corporation or other managing body. As such, the enterprise device identity proxy 220 allows an enterprise to treat a device with cellular connectivity using the same rules that would apply to other access/connection types without expensive changes.

Figure 5:
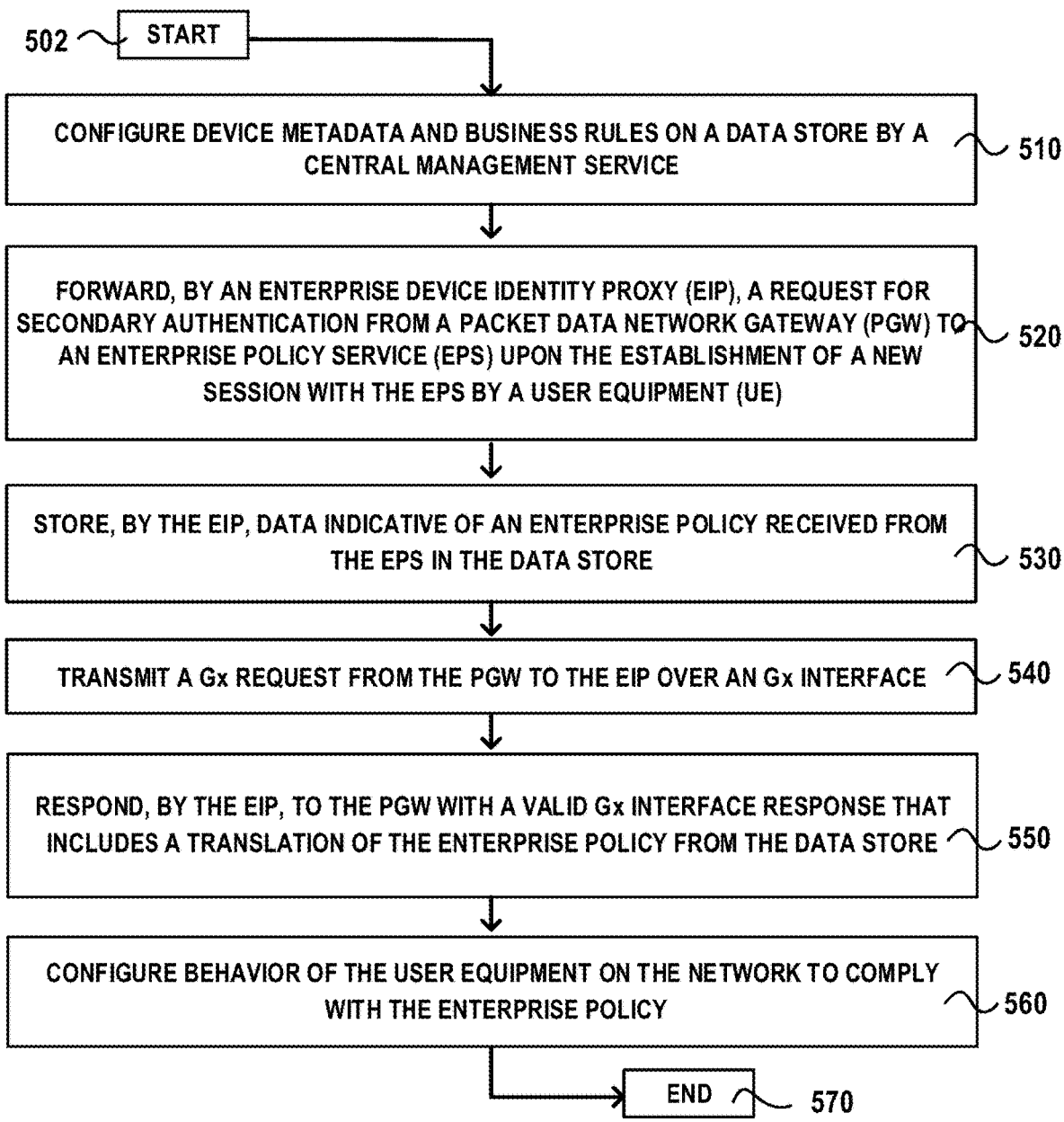
FIG. 5 is a process flow that shows an overall process for facilitating communication between a PGW component of a 4G network environment and a device profile store of an Enterprise network in communication with the 4G network environment in accordance with some aspects of the disclosed technology.

FIG. 5 illustrates an example method 500 for transforming an enterprise policy from a service-specific format into a valid Gx format understandable by the PGW 403 so that the 4G core network or a subsequent hop in the enterprise network can apply the enterprise policy. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

According to some examples, the method includes configuring device metadata and business rules on a data store by a central management service at step 510. For example, the central management service 210 illustrated in FIG. 2 (which is also applicable to the network of FIG. 4), can configure device metadata and business rules on the data store 230. The device metadata identifies various enterprise policies that should be applied based on the device metadata, and the business rules dictate transformations of the enterprise policies into a particular network context, which is in some embodiments a 4G/LTE/3GPP core network. Further, according to some examples outlined herein, the method includes forwarding, by an enterprise device identity proxy, a request for secondary authentication from a function of the mobile network (e.g., the PGW) to the enterprise policy service upon the establishment of a new session at step 520. The method further includes at step 530 storing, in the data store and by the enterprise device identity proxy, data indicative of the enterprise policy received from the enterprise policy service. The method includes step 540, which outlines transmitting a request between the PGW and the enterprise device identity proxy over a Gx interface. The method further provides step 550, which includes responding, by the enterprise device identity proxy, to the PGW with a valid Gx response that includes a translation of the enterprise policy from the data store, the enterprise policy having been translated into the valid Gx response based on the business rules configured in step 510. The method further includes step 560, in which the PGW configures a data plane or otherwise configures the UE to comply with the enterprise policy. It will be understood by those of ordinary skill in the art that although the PGW receives a valid response over the Gx interface, it does not mean that the entire enterprise policy can be applied by the data plane or 4G core network. But the PGW can configure the data plane as required by the translated policy. In many cases this might make it so that data going to or coming from the data plane can be tagged in a way that the rest of the enterprise network (outside of the 4G core network) can apply the enterprise policy.

Figure 6:
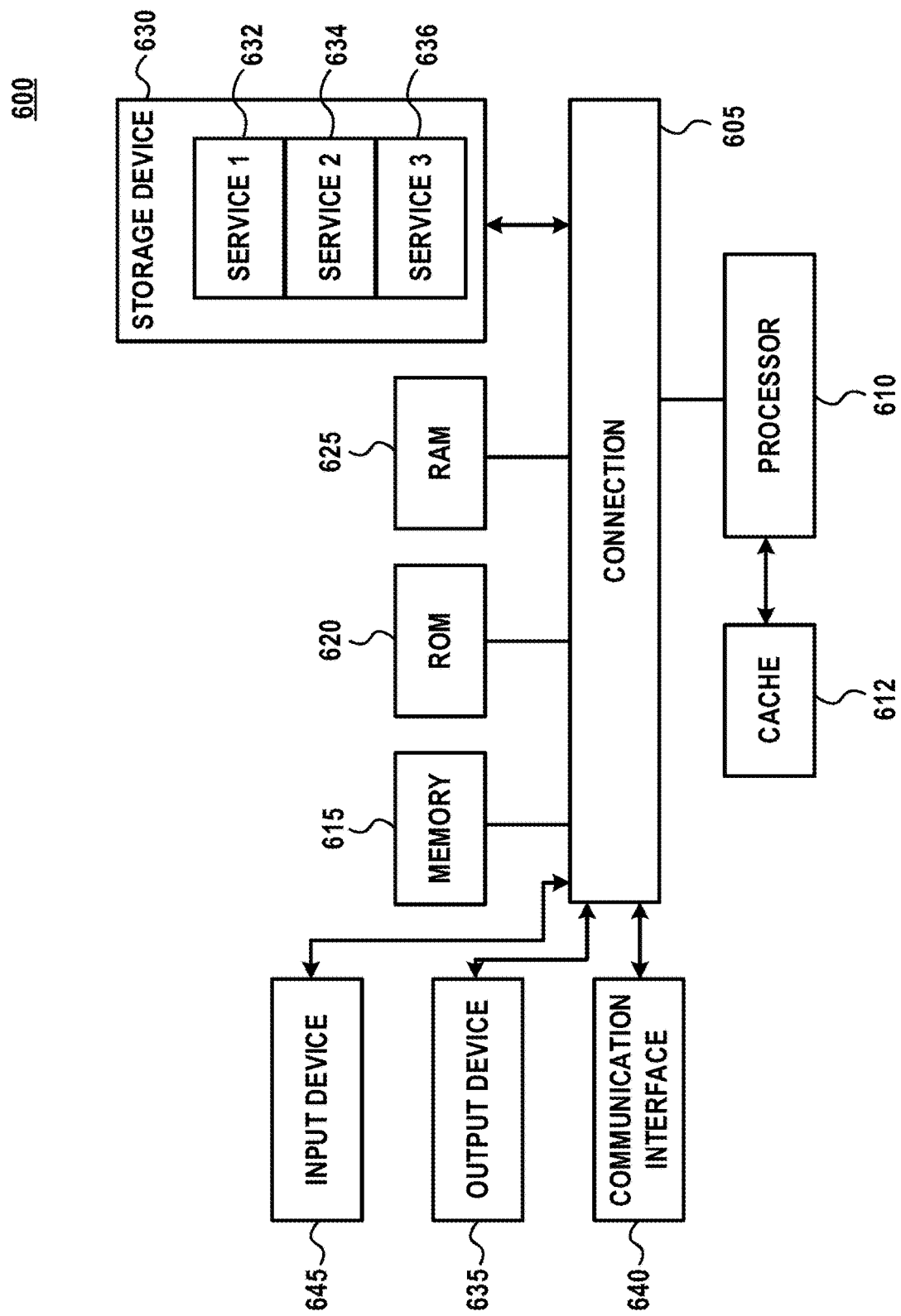
FIG. 6 shows an example computing system in accordance with some aspects of the disclosed technology.

FIG. 6 shows an example of computing system 600, which can be for example any computing device making up any of the entities illustrated in FIGS. 1B, 2, and 4, for example, enterprise device identity proxy 220, or any component thereof in which the components of the system are in communication with each other using connection 605. Connection 605 can be a physical connection via a bus, or a direct connection into processor 610, such as in a chipset architecture. Connection 605 can also be a virtual, networked connection, or logical connection.

In some embodiments, computing system 600 is a distributed system in which the functions described in this disclosure can be distributed within a data center, multiple data centers, a peer network, etc. In some embodiments, one or more of the described system components represents many such components each performing some or all of the function for which the component is described. In some embodiments, the components can be physical or virtual devices.

An example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, close to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of many output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer-readable media which can store data that are accessible by a computer, such as magnetic cassettes, flash memory cards, solid-state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in the memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for applying an enterprise policy using an N7 interface of a 5G core network, the method comprising:
retrieving a policy transformation from a data store, wherein the policy transformation dictates how one or more attributes present in an enterprise policy is transformed into N7 attributes, and the data store including one or more policy transformations for one or more valid N7 interface responses for a plurality of enterprise policies configured on an enterprise policy service;
receiving a request for the enterprise policy from a session management function (SMF) by an enterprise device identity proxy;
retrieving the enterprise policy from the enterprise policy service by the enterprise device identity proxy; and
transforming the enterprise policy into a valid N7 interface response to the SMF by the enterprise device identity proxy.

2. The method of claim 1, wherein the policy transformation is provided to the data store by a centralized management system.

3. The method of claim 2, further comprising:
updating the policy transformation at the data store by the centralized management system.

4. The method of claim 1, wherein the enterprise policy service provides the enterprise policy applicable for one or more network technologies.

5. The method of claim 1, further comprising:
receiving a N7 request from the SMF by the enterprise device identity proxy; and
responding to the N7 request with the valid N7 interface response that is effective to implement the enterprise policy in a session wherein access is provided by a 5G core network.

6. The method of claim 1, wherein the request for the enterprise policy from the session management function (SMF) is a request for secondary authentication.

7. The method of claim 1, wherein the enterprise policy service is a Remote Authentication Dial-In User Service (RADIUS).

8. The method of claim 7, wherein the enterprise policy is represented as one or more Attribute Value Pairs (AVPs), wherein the AVPs are transformed into the valid N7 interface response by the enterprise device identity proxy.

9. A system for applying an enterprise policy using an N7 interface of a 5G core network, the system comprising:
a processor in communication with a memory and a network, the memory including instructions, which, when executed, cause the processor to:
retrieve a policy transformation from a data store, wherein the policy transformation dictates how one or more attributes present in an enterprise policy is transformed into N7 attributes, and the data store including one or more policy transformations for one or more valid N7 interface responses for a plurality of enterprise policies configured on an enterprise policy service;
provide an enterprise device identity proxy between a session management function and the enterprise policy service across an N7 interface of the network;
receive a request for the enterprise policy from a session management function (SMF) by the enterprise device identity proxy;
retrieve the enterprise policy from an enterprise policy service by the enterprise device identity proxy; and
transform the enterprise policy into a valid N7 interface response to the SMF by the enterprise device identity proxy.

10. The system of claim 9, wherein,
the policy transformation is provided to the data store by a centralized management system.

11. The system of claim 10, wherein the memory includes instructions, which, when executed, further cause the processor to:
update the policy transformation at the data store by the centralized management system.

12. The system of claim 9, wherein the enterprise policy service provides the enterprise policy applicable for one or more network technologies.

13. The system of claim 9, wherein the memory includes instructions, which, when executed, further cause the processor to:
receive a N7 request from the SMF by the enterprise device identity proxy; and
respond to the N7 request with the valid N7 interface response that is effective to implement the enterprise policy in a session wherein access is provided by the network, wherein the network is a 5G core network.

14. The system of claim 9, wherein the request for the enterprise policy from the session management function (SMF) is a request for secondary authentication.

15. The system of claim 9, wherein the enterprise policy service is a Remote Authentication Dial-In User Service (RADIUS) and wherein the enterprise policy is represented as one or more Attribute Value Pairs (AVPs), wherein the AVPs are transformed into the valid N7 interface response by the enterprise device identity proxy.

16. A non-transitory computer readable medium comprising instructions stored thereon, which, when executed, the instructions are effective to cause at least one processor to:
retrieve a policy transformation from a data store, wherein the policy transformation dictates how one or more attributes present in an enterprise policy are transformed into mobile network attributes, and the data store including one or more policy transformations for one or more valid mobile network responses for a plurality of enterprise policies configured on an enterprise policy service;
receive a request for the enterprise policy from a function of a mobile network by an enterprise device identity proxy;
retrieve the enterprise policy from the enterprise policy service by the enterprise device identity proxy; and
transform the enterprise policy into a valid mobile network response to the function of the mobile network by the enterprise device identity proxy, wherein the enterprise policy is transformed to be interpretable and implementable on the mobile network.

17. The non-transitory computer readable medium of claim 16, wherein the mobile network is a 5G network and the function of the mobile network is a service management function (SMF) and the valid mobile network response is a valid N7 interface response.

18. The non-transitory computer readable medium of claim 17, wherein the mobile network is a 4G network, a 3GPP network, and/or an LTE network, and the function of the mobile network is a public data network gateway (PGW) and the valid mobile network response is a valid Gx interface response.

19. The non-transitory computer readable medium of claim 16, wherein the request for the enterprise policy is a request for secondary authentication.

20. The non-transitory computer readable medium of claim 16, wherein the enterprise policy service is a Remote Authentication Dial-In User Service (RADIUS).

* * * * *